(12) United States Patent
Vigholm (10) Patent No.: US 9,903,098 B2
(45) Date of Patent: Feb. 27, 2018

(54) PILOT PRESSURE CONTROL SYSTEM

(71) Applicant: VOLVO CONSTRUCTION EQUIPMENT AB, Eskilstuna (SE)

(72) Inventor: Bo Vigholm, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 149 days.

(21) Appl. No.: 14/771,393

(22) PCT Filed: Mar. 6, 2013

(86) PCT No.: PCT/SE2013/000033
§ 371 (c)(1),
(2) Date: Aug. 28, 2015

(87) PCT Pub. No.: WO2014/137250
PCT Pub. Date: Sep. 12, 2014

(65) Prior Publication Data
US 2016/0002886 A1    Jan. 7, 2016

(51) Int. Cl.
*F15B 13/043*    (2006.01)
*E02F 9/22*    (2006.01)
(Continued)

(52) U.S. Cl.
CPC .............. *E02F 9/225* (2013.01); *B62D 5/091* (2013.01); *E02F 9/0841* (2013.01); *E02F 9/226* (2013.01);
(Continued)

(58) Field of Classification Search
CPC .... F15B 13/0433; F15B 13/435; F15B 13/43; F15B 13/42; F15B 2211/355;
(Continued)

(56) References Cited

U.S. PATENT DOCUMENTS 4,870,892 A  *  10/1989  Thomsen .............. F15B 11/006
                                            137/614.19
5,568,759 A     10/1996  Aardema
                (Continued)

FOREIGN PATENT DOCUMENTS

| EP | 1813821 A1 | 8/2007 |
| EP | 2112052 A1 | 10/2009 |
| WO | 2009005425 A1 | 1/2009 |

OTHER PUBLICATIONS

International Search Report (dated Dec. 2, 2013) for corresponding International App. PCT/SE2013/000033.
(Continued)

*Primary Examiner* — Thomas E Lazo
*Assistant Examiner* — Michael Quandt
(74) *Attorney, Agent, or Firm* — WRB-IP LLP (57) ABSTRACT

A pilot pressure control system for controlling a pilot signal pressure at a pilot inlet of a control valve includes a pilot outlet adapted to be connected to the pilot inlet. The pilot pressure control assembly further includes a first pilot valve assembly and a second pilot valve assembly. Each one of the first and second pilot valve assemblies are individually controllable so as to selectively provide a first fluid flow direction from a pressure line to the pilot outlet and a second fluid flow direction from the pilot outlet to a drain line. At least the first pilot valve assembly is adapted to assume a maximum pressure supply condition so as to supply a first pilot valve assembly maximum pressure to the pilot outlet. At least the second pilot valve assembly is adapted to provide a pressure drop from the pilot outlet to the drain line via the second pilot valve assembly. The pilot pressure control system is configured such that, when the pilot pressure control system is connected to the pressure and drain lines and when the first pilot valve assembly is controlled so as to assume the maximum pressure supply
(Continued)

condition and the second pilot valve assembly provides a fluid flow in the second fluid direction with a minimum pressure drop, the pressure at the pilot outlet is equal to or above 20 of the first pilot valve assembly maximum pressure (Pmax).

11 Claims, 7 Drawing Sheets (51) Int. Cl.
*F15B 20/00* (2006.01)
*B62D 5/09* (2006.01)
*F15B 21/08* (2006.01)
*E02F 9/08* (2006.01)

(52) U.S. Cl.
CPC .......... *E02F 9/2267* (2013.01); *E02F 9/2285* (2013.01); *E02F 9/2296* (2013.01); *F15B 13/0433* (2013.01); *F15B 20/008* (2013.01); *F15B 21/087* (2013.01); *F15B 2211/20546* (2013.01); *F15B 2211/355* (2013.01); *F15B 2211/6355* (2013.01); *F15B 2211/67* (2013.01); *F15B 2211/7128* (2013.01); *F15B 2211/8636* (2013.01); *F15B 2211/8752* (2013.01)

(58) Field of Classification Search
CPC .......... F15B 2211/575; F15B 2211/635; F15B 2211/67; F15B 13/0435; F15B 13/043; F15B 13/042
USPC .......................................................... 91/454
See application file for complete search history.

(56) References Cited

U.S. PATENT DOCUMENTS

| 5,664,477 A | 9/1997 | Koehler |
| 7,434,653 B2* | 10/2008 | Khalil ............... B62D 5/06 137/625.23 |
| 7,849,686 B2* | 12/2010 | Nielsen ............... F15B 11/003 60/403 |
| 2006/0117942 A1 | 6/2006 | Kim |
| 2010/0108431 A1 | 5/2010 | Makuta et al. |
| 2011/0289908 A1 | 12/2011 | Johnson et al. |

OTHER PUBLICATIONS

Supplementary European Search Report (dated Jan. 24, 2017) for corresponding European App. EP 13 87 7325.
Supplementary Partial European Search Report (dated Sep. 27, 2016) for corresponding European App. EP 13 87 7325.

* cited by examiner

PILOT PRESSURE CONTROL SYSTEM

BACKGROUND AND SUMMARY

The present disclosure relates to a pilot pressure control system. Moreover, the present disclosure relates to a method for supplying a pilot pressure to a pilot inlet of a control valve.

A control valve of a hydraulic control circuit may be controlled by adjusting a pilot signal pressure at one or more pilot inlets of the control valve. To this end, the hydraulic control circuit may include an electric proportional valve, such as a solenoid valve, that receives an electric control signal and supplies a pilot signal pressure, indicative of the electric control signal, to one of the pilot inlets of the control valve.

Purely by way of example, a hydraulic circuit, such as the one that has been described hereinabove, may be used in a steering system for an articulated vehicle such as a wheel loader or an articulated hauler. Such a hydraulic circuit may allow a driver of the articulated vehicle to control the steering of the articulated vehicle by means of a control member, such as a joystick, which via electrical signals communicates with solenoid valves of the hydraulic control circuit such that the solenoid valves in turn control the pilot signal pressures of the pilot inlets of the control valve. As such, the above hydraulic circuit presents a steer-by-wire possibility to the driver.

However, there is a risk that an incorrect electronic communication occurs between the control member and the solenoid valves. Moreover, there is a risk that a solenoid valve as such is impaired which in turn results in that it does not operate as desired. As such, a vehicle adapted to be operated by a steer-by-wire system is often also provided with a second hydraulic steering system, e.g. a steering system comprising a steering wheel and an orbitrol, in order to increase the reliability of the vehicle's steering.

In order to increase the accuracy of a control valve that is operated by means of pilot signal pressures produced by electronic proportional valves, US2006/0117942 A1 proposes that displacement sensors be installed on the ends of the control valve. The displacement sensors may be used for determining whether or not the control valve is in normal operation and, if it is not, modifying the control signal to the electronic proportional valves such that a requested condition of the control valve is nevertheless obtained.

Although the US2006/0117942 A1 control circuit provides an appropriate level of reliability for many applications, it may nevertheless be desired to increase the reliability further.

It is desirable to provide a pilot pressure control system that has an appropriate reliability level.

As such, the present disclosure relates, according to an aspect thereof, to a pilot pressure control system for controlling a pilot signal pressure at a pilot inlet of a control valve. The pilot pressure control assembly comprises a pilot outlet adapted to be connected to the pilot inlet.

According to an aspect of the present disclosure, the pilot pressure control assembly further comprises a first pilot valve assembly and a second pilot valve assembly. Each one of the first and second pilot valve assemblies is individually controllable so as to selectively provide a first fluid flow direction from a pressure line to the pilot outlet and a second fluid flow direction from the pilot outlet to a drain line. At least the first pilot valve assembly is adapted to assume a maximum pressure supply condition so as to supply a first pilot valve assembly maximum pressure Pmax to the pilot outlet. At least the second pilot valve assembly is adapted to provide a pressure drop from the pilot outlet to the drain line via the second pilot valve assembly.

Moreover, the pilot pressure control system is configured such that, when the pilot pressure control system is connected to the pressure and drain lines and when the first pilot valve assembly is controlled so as to assume the maximum pressure supply condition and the second pilot valve assembly provides a fluid flow in the second fluid direction with a minimum pressure drop, the pressure at the pilot outlet is equal to or above 20% of the first pilot valve assembly maximum pressure. Alternatively, the pressure may be equal to or above 30% of the first pilot valve assembly maximum pressure.

By virtue of a pilot pressure control system according to the above it is ensured that even if the second pilot valve assembly malfunctions such that is inadvertently provides a minimum pressure drop to the drain line, e.g. by inadvertently providing a maximum opening to the drain line, the pilot pressure control system as a whole will nevertheless still be able to provide an appropriately large pressure to the pilot outlet. This in turn implies that the pilot pressure control system will still be able to change the condition of the control valve to which it is connected.

Optionally, when the first pilot valve assembly is controlled so as to assume the maximum pressure supply condition and the second pilot valve assembly provides a minimum pressure drop, the pressure at the pilot outlet is equal to or less than 80% of the first pilot valve assembly maximum pressure. Alternatively, the pressure at the pilot outlet is equal to or less than 70% of the first pilot valve assembly maximum pressure.

The feature that the pressure is equal to or below any one of the above limits implies that it may be possible to change the condition of the control valve to which the pilot pressure control system is connected even if the first pilot valve assembly malfunctions such that it inadvertently assumes a maximum pressure condition. By virtue of the fact that the pressure at a first pilot inlet that is associated with the malfunctioning first pilot valve assembly is below any one of the above discussed ranges, it is possible to change the condition of the control valve by applying a second pressure to a second pilot inlet, which second pressure essentially only needs to exceed a pressure of 80%, alternatively 70%, of the first pilot valve assembly maximum pressure. Purely by way of example, the condition of the control valve may be changed by applying a pressure that is approximately equal to the first pilot valve assembly maximum pressure to the second pilot inlet.

Optionally, the pilot pressure control system comprises a throttling arrangement adapted to throttle fluid flowing from the pilot outlet to the drain line via the second pilot valve assembly.

The above discussed throttling arrangement may be used in order to obtain a preferred minimum pressure drop over the second pilot valve assembly.

Optionally, the throttling arrangement is also adapted to throttle fluid flowing from the pressure line to the pilot outlet via the first pilot valve assembly.

The above discussed pressure line throttling arrangement may be used in order to obtain the maximum pressure at the pilot outlet.

A second aspect of the present disclosure relates to a pilot pressure control assembly for a control valve. The pilot pressure control assembly comprises a first pilot pressure control system according to the first aspect of the present disclosure for controlling, the pilot pressure at a first pilot inlet of the control valve. The pilot pressure control assembly further comprises a second pilot pressure control system according to the first aspect of the present disclosure for controlling the pilot pressure at a second pilot inlet of the control valve.

A pilot pressure control assembly according to the second aspect of the present disclosure may provide a relatively high reliability since such a control assembly increases the possibilities that the condition of the control valve may be changed even if one of the pilot valve assemblies of the pilot pressure control assembly does not function as desired. Moreover, a pressure control assembly according to the second aspect may be able change the position of the control valve, even in the event of a malfunctioning pilot valve assembly, without the need of firstly identifying a malfunctioning, valve and thereafter modifying the operation of the pilot pressure control assembly.

A third aspect of the present disclosure relates to a pressurized medium control system. The control system comprises a control valve which in turn comprises a pilot inlet. The pressurized medium control system further comprises a pilot pressure control system according to the first aspect of the present disclosure and/or a pilot pressure control assembly according to the second aspect of the present disclosure.

A fourth aspect of the present disclosure relates to a pressurized medium steering assembly for an articulated vehicle. The pressurized medium steering assembly comprises a pressurized medium control system according to the third aspect of the present disclosure and/or a pilot pressure control assembly according to the second aspect of the present disclosure and/or a pilot pressure system according to the first aspect of the present disclosure.

A fifth aspect of the present disclosure relates to a vehicle comprising a pilot pressure system according to the first aspect of the present disclosure and/or a pilot pressure control assembly according to the second aspect of the present disclosure and/or a pressurized medium control system according to the third aspect of the present disclosure and/or a pressurized medium steering assembly according to the fourth aspect of the present disclosure.

A sixth aspect of the present disclosure relates to a method for supplying a pilot pressure to a pilot inlet of a control valve using a pilot pressure control assembly. The pilot pressure control assembly comprises a first pilot valve assembly and a second pilot valve assembly. Each one of the first and second pilot valve assemblies is individually controllable so as to selectively provide a first fluid flow direction from a pressure line to the pilot inlet and a second fluid flow direction from the pilot inlet, to a drain line.

According to the sixth aspect of the present disclosure, the method comprises:
issuing individual control signals to each one of the first and second pilot valve assemblies,
for at least one of the first and second pilot valve assemblies throttling a fluid flow from the pilot inlet to the drain line.

Optionally, the method further comprises:
for at least one of the first and second pilot valve assemblies, throttling a fluid flow from the pressure line to the pilot inlet.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION

Figure 1:
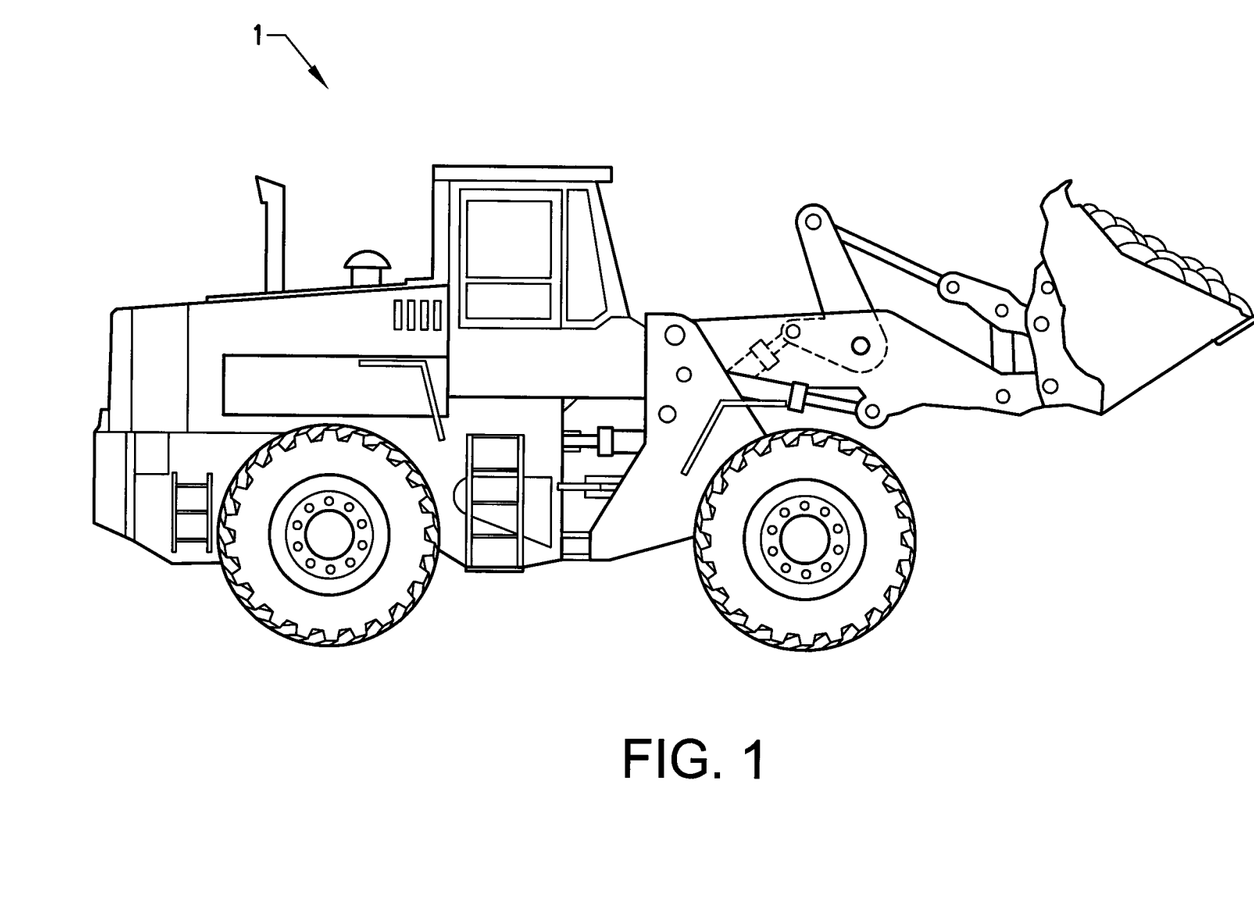
FIG. 1 illustrates a vehicle.

The invention will below be described, for a vehicle in the form of a wheel loader 1 such as the one illustrated in FIG. 1. The wheel loader 1 should be seen as an example of a vehicle which could comprise a pilot pressure control system according to the present invention. However, the pilot pressure control system of the present invention may be implemented in a plurality of different types of objects, e.g. other types of vehicles. Purely by way of example, the pilot pressure control system could be implemented in a truck, a lorry, a tractor, a car, a bus, a work machine such as a wheel loader or an articulated hauler or any other type of construction equipment.

Figure 2:
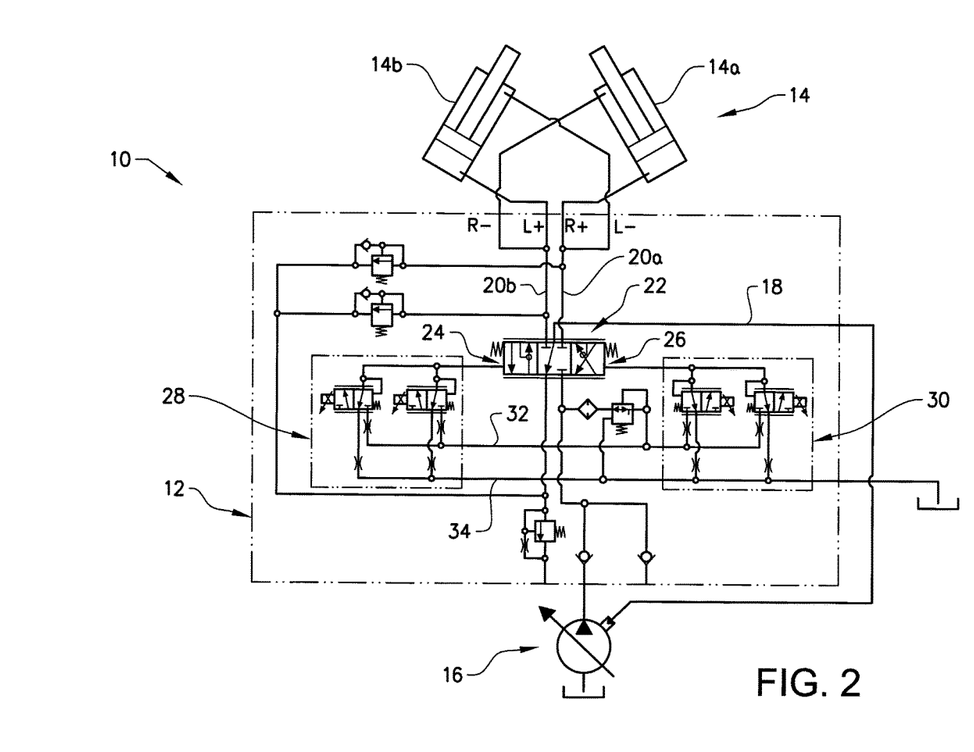
FIG. 2 schematically illustrates a pressurized steering assembly.

FIG. 2 schematically illustrates an embodiment of a pressurized medium steering assembly 10. Purely by way of example, the FIG. 2 pressurized medium steering assembly 10 may be used for steering an articulated vehicle, such as the wheel loader 1 illustrated in FIG. 1. Purely by way of example, the pressurized medium may be a gas, such as air, or a liquid, such as oil.

The FIG. 2 pressurized medium steering assembly 10 comprises a pressurized medium control system 12 adapted to control the medium supply to a pressurized medium motor 14. In the FIG. 2 embodiment, the pressurized medium motor 14 comprises two cylinders 14a, 14b each one of which being, adapted to be in fluid communication with the pressurized medium control system 12.

Moreover, the FIG. 2 pressurized medium steeling assembly 10 may comprise a pressure source 16. Purely by way of example, the pressure source 16 may comprise a pump such as a variable displacement pump.

Purely by way of example, and as is indicated in the FIG. 2 embodiment, the pressure source 16 may be adapted to receive a signal indicative of the pressure that is supplied from the pressurized medium control system 12 to at least a portion of the pressurized medium motor 4. To this end, although purely by way of example, the pressure source 16 may be in fluid communication with a pressure indication conduit 18 that in turn is selectively in fluid communication with at least one active pressurized medium conduit 20a, 20b.

As a non-limiting example, the pressure source 16 may be adapted to supply pressurized medium at a pressure level that is a predetermined pressure level above the pressure of the pressurized medium that is supplied from the pressurized medium control system 12 to at least a portion of the pressurized medium motor 14.

The pressurized medium control system 12 comprises a control valve 22. The control valve 22 may be adapted to provide a fluid communication between the pressure source 16 and portions of the pressurized medium motor 14. Purely by way of example, the control valve 22 may also be adapted to control the pressure and/or the flow of the pressurized medium that is supplied to the pressurized medium motor 4.

The control valve 22 comprises a first 24 and a second 26 pilot inlet. A pilot signal pressure at the first pilot inlet 24 is controlled by a first pilot pressure control system 28 and a pilot signal pressure at the second pilot inlet 26 is controlled by a second pilot pressure control system 30. Each one of the first and second pilot pressure control systems 28, 30 may be connected to a pressure line 32 and a drain line 34. In the embodiment illustrated in FIG. 2 each one of the first and second pilot pressure control systems 28, 30 are connected to a common pressure line 32 and a common drain line 34. However, in other embodiments, each one of the pressure control systems 23, 30 may be connected to individual pressure lines (not shown) and/or individual drain lines (not shown). Purely by way of example, each one of the pressure line 32 and the drain line 34 may comprise one or more conduits.

The pressure in the pressure line 32 is generally greater than the pressure in the drain line 34. As a non-limiting example, the pressure in the drain line 34 may be approximately atmospheric pressure. Moreover, although purely by way of example, the pressure in the pressure line 32 may be above 10 bars. As a non-limiting example, the pressure in the pressure line may be approximately 35 bars.

Figure 3:
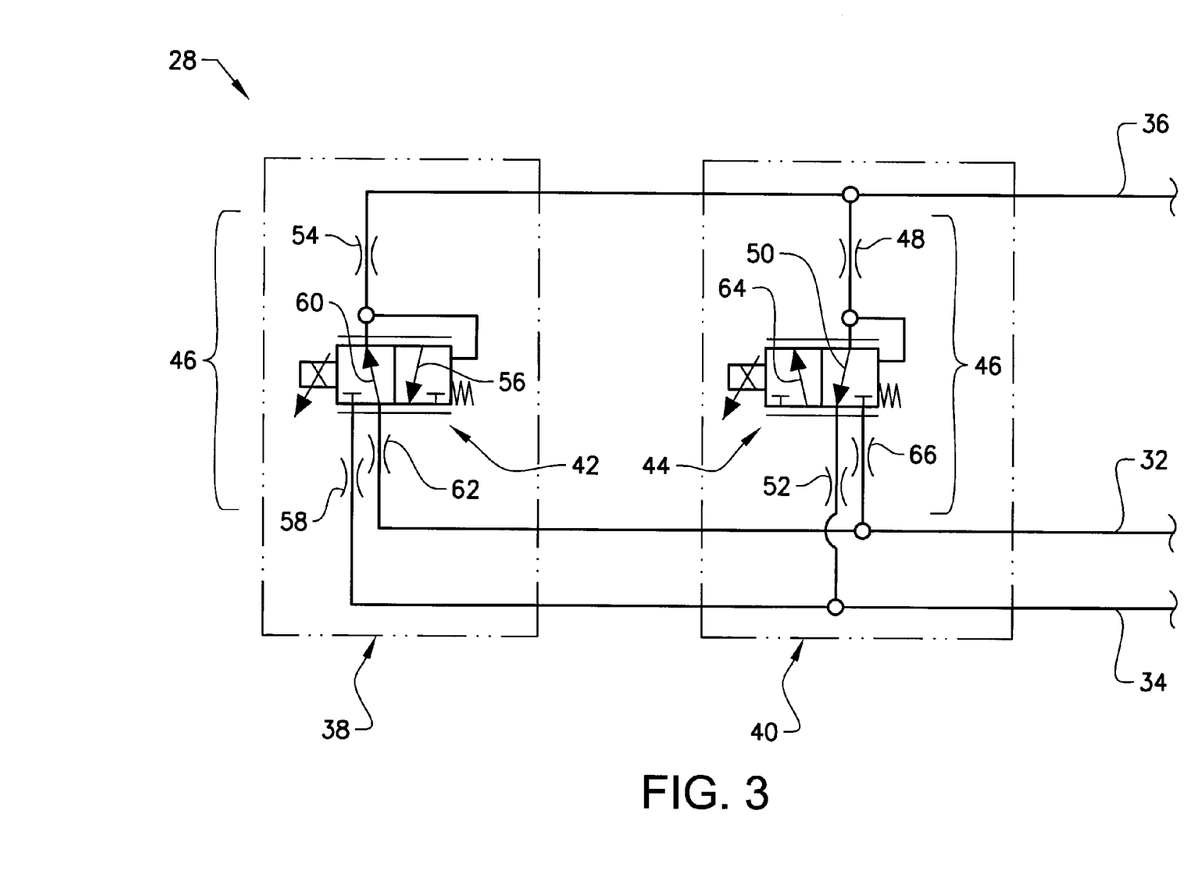
FIG. 3 schematically illustrates an embodiment of a pilot, pressure control system.

FIG. 3 illustrates an embodiment of a pilot pressure control system 28 according to the present invention. Purely by way of example, the FIG. 3 pilot pressure control system 28 may be used as the first pilot pressure control system and/or the second pilot pressure control system in the FIG. 2 embodiment of a pressurized medium steering assembly 10.

The embodiment of the pilot pressure control system 28 illustrated in FIG. 3 is suitable for controlling a pilot signal pressure at a pilot inlet of a control valve such as the control valve illustrated in FIG. 2 (not shown in FIG. 3).

The FIG. 3 pilot pressure control system 28 comprises a pilot outlet 36 adapted to be connected to a pilot inlet (not shown) of a control valve (not shown). Purely by way of example, the pilot outlet 36 may comprise one or more conduits. The pilot pressure control assembly further comprises a first pilot valve assembly 38 and a second pilot valve assembly 40. Each one of the first and second pilot valve assemblies 38, 40 is individually controllable so as to selectively provide a first fluid flow direction from the pressure line 32 to the pilot outlet 36 and a second fluid flow direction from the pilot outlet 36 to a drain line 34.

To this end, each one of the first and second pilot valve assemblies 38, 40 may preferably comprise a controllable valve 42, 44. Purely by way of example, such a controllable valve 42, 44 may be electrically controlled. As a non-limiting example, such a valve may be electrically controlled by means of a control member (not shown) which via electrical signals communicates with the controllable valve 42, 44. Purely by way of example, the controllable valve 42, 44 may comprise an electrically controlled pressure reducing valve, preferably a pressure control solenoid valve. As may be gleaned from FIG. 3, the controllable valve 42, 44 is preferably a three-way valve.

As other non-limiting examples, one or both of the controllable valves 42, 44 may comprise an on/off valve and/or an electrically controlled flow control valve.

At least the first pilot valve assembly 38 is adapted to assume a maximum pressure supply condition so as to supply a first pilot valve assembly maximum pressure Pmax to the pilot outlet 36. Purely by way of example, if the first pilot valve assembly 38 comprises an electrically controlled pressure reducing valve 42, the above discussed a first pilot valve assembly maximum pressure Pmax may be obtained by issuing an electrical signal to the electrically controlled pressure reducing valve 42 indicative of that the valve 42 should assume a condition in which it can supply as high a pressure as possible to the pilot outlet 36.

Moreover, at least the second pilot valve assembly 40 is adapted to provide a pressure chop from the pilot outlet 36 to the drain line 34 via the second pilot valve assembly 40. Purely by way of example, the second pilot valve assembly 40 may be adapted to vary the pressure drop from the pilot outlet 36 to the drain line 34. As a non-limiting example, the second pilot valve assembly 40 may comprise an electrically controlled valve that can provide a variable percentage opening, and consequently a variable pressure drop, for fluid that flows from the pilot outlet 36 to the drain line 34.

During normal operation of the FIG. 3 pilot pressure control system 28, each one of the first and second pilot valve assemblies 38, 40 is controlled, so as to provide a pilot signal pressure portion to the pilot outlet 36. As such, each one of the first and second pilot valve assemblies 38, 40 is adapted to supply a predetermined pressure to the pilot outlet 36.

Moreover, the pilot pressure control system 28 is configured such that, when the pilot pressure control system is connected to the pressure and drain lines 32, 34 and when the first pilot valve assembly 38 is controlled so as to assume the maximum pressure supply condition and the second pilot valve assembly 40 provides a fluid flow in said second fluid direction with a minimum pressure drop, the pressure at the pilot outlet 36 is equal to or 5 above 20%, preferably equal to or above 30%, of the first pilot valve assembly maximum pressure Pmax. As other non-limiting examples, the pilot pressure control system 28 may be configured such that, in the above discussed conditions of the first and second pilot valve assemblies 38, 40, the pressure at the pilot outlet 36 is equal to or above 40%, preferably equal to or above 45%, of the first pilot valve assembly maximum pressure Pmax.

Purely by way of example, the value of the pressure at the pilot outlet 36 may be determined when a portion of the pilot outlet 36 is adapted to receive a counter pressure the size of which is substantially the same as the pressure that is provided by the first and second pilot valve assemblies 38, 40 when they assume the above discussed conditions. Purely by way of example, the pilot outlet 36 may be connected to the pilot inlet of the control valve that the pilot pressure control system is adapted to control. As another non-limiting example, a portion of the pilot outlet, such as the end thereof that is adapted to face the control valve, may be sealed. Moreover, although purely by way of example, the pressure in the pilot outlet 36 may be determined using a pressure sensor (not shown).

The pressure equal to or above the above discussed limits for the specific valve conditions may be obtained in a plurality of ways. Purely by way of example, the pilot pressure control system 28 may comprise a throttling arrangement 46 adapted to throttle fluid flowing from the pilot outlet 36 to the drain line 34 via the second pilot valve assembly 40.

The throttling arrangement 46 may comprise one or more throttlings. Purely by way of example, the throttling arrangement 46 may comprise an upper throttling 48 that is located between the second controllable valve 44 and the pilot outlet 36. As another non-limiting example, the second controllable valve 44 may comprise a drain valve throttling 50. Thus, the second controllable valve 44 may itself be designed so as to provide a pressure drop for fluid flowing from the pilot outlet 36 to the drain line 34. As a further non-limiting example, the throttling arrangement 46 may comprise a lower drain throttling 52 that is located between the second controllable valve 44 and the drain line 34.

It is also envisaged that embodiments of the pilot pressure control system 28 may comprise at least two of the above discussed throttlings i.e. an upper throttling 48 and/or a drain valve throttling 50 and/or a lower drain throttling 52.

Purely by way of example, any one of the above discussed drain throttlings 48, 50, 52 may comprise a conduit restriction such that the cross-sectional area of the conduit restriction is less than or equal to 80%, preferably less than or equal to 70 more preferred less than or equal to 60% of the cross-sectional area of the conduit that is adjacent to the throttling. Purely by way of example, it is envisaged that implementations of the above discussed conduit restriction may have a cross-sectional area that is less than or equal to 40%, preferably less than or equal to 20%, more preferred less than or equal to 10% of the cross-sectional area of the conduit that is adjacent to the throttling.

As a non-limiting example, each one of the conduits that form the pressure and drain lines 32, 34 as well as the pilot outlet 36 may have a diameter that is approximately 8 mm. Moreover, and again purely by way of example, the diameter of the conduit restriction in any one of the above discussed drain throttling 48, 50, 52 may be approximately 2 mm.

FIG. 3 also illustrates an embodiment of a pilot pressure control system 28 wherein the throttling arrangement 46 is also adapted to throttle fluid flowing from the pilot outlet 36 to the drain line 34 via the first pilot valve assembly 38. As such, the throttling arrangement 46 may comprise an upper throttling 54 and/or a drain valve throttling 56 and/or a lower drain throttling 58 associated with the first pilot valve assembly 38.

Moreover, an embodiment of the pilot pressure control system 28 is preferably configured such that when the first pilot valve assembly 38 is controlled so as to assume the maximum pressure supply condition and the second pilot valve assembly 40 provides a minimum pressure drop, the pressure at the pilot outlet 36 is equal to or less than 80%, preferably less than 70%, of the first pilot valve assembly maximum pressure Pmax.

To this end, the throttling, arrangement 46 may also be adapted to throttle fluid flowing from the pressure line 32 to the pilot outlet 36 via the first pilot valve assembly 38. Purely by way of example, the upper throttling 54 associated with the first pilot valve assembly 36 may be adapted to also throttle fluid that flows from the pressure line 32 to the pilot outlet 36. As another non-limiting example, the first controllable valve 42 may comprise a pressure valve throttling 60. Thus, the first controllable valve 42 may itself be designed so as to provide a pressure drop for fluid flowing from the pressure line 32 to the pilot outlet 36. As a further non-limiting example, the throttling arrangement 46 may comprise a lower pressure throttling 62 that is located between the first controllable valve 42 and the pressure line 32.

It is also envisaged that embodiments of the pilot pressure control system 28 may comprise at least two of the above discussed pressure throttlings i.e. an upper throttling 54 and/or a pressure valve throttling 60 and/or a pressure drain throttling 52.

Purely by way of example, any one of the above discussed pressure throttlings 54, 60, 62 may comprise a conduit restriction such that the cross-sectional area of the conduit restriction is less than or equal to 80%, preferably less than or equal to 70%, more preferred less than or equal to 60% of the cross-sectional area of the conduit that is adjacent to the throttling. Purely by way of example, it is envisaged that implementations of the above discussed conduit restriction may have a cross-sectional area that is less than or equal to 40%, preferably less than or equal to more preferred less than or equal to 10% of the cross-sectional area of the conduit that is adjacent to the throttling.

In the example discussed hereinabove, wherein the diameter of the conduits is approximately 8 mm, the diameter of the conduit restriction in any one of the above discussed pressure throttlings 54, 60, 62 may be approximately 1.6 mm.

As a non-limiting example, the pressure in the pressure line may be approximately 35 bars, the pressure in the drain line 34 may be approximately 0 to 1 bar, the diameter of the conduits that form the pressure and drain lines 32, 34 as well as the pilot outlet 36 may have a diameter of approximately 8 mm, Moreover, and again purely by way of example, the throttling arrangement 46 may be constituted by a drain conduit restriction the diameter of which is approximately 2 mm and a pressure conduit restriction the diameter of which is approximately 1.6 mm.

In the above discussed, non-limiting example, when first pilot valve assembly 38 is controlled so as to assume its maximum pressure supply condition (that maximum supply pressure is in this non-limiting example 20 bars) and the second pilot valve assembly 40 provides a minimum pressure drop, the pressure at the pilot outlet 36 is approximately 10 bars.

FIG. 3 also illustrates an embodiment of a pilot pressure control system 28 wherein the throttling arrangement 46 is also adapted to throttle fluid flowing from the pressure line 32 to the pilot outlet 36 via, the second pilot valve assembly 40. As such, the throttling arrangement 46 may comprise a pressure valve throttling 64 and/or a lower pressure throttling 66 associated with the second pilot valve assembly 40.

The function of a pilot pressure control system 28, such as the one that has been presented in conjunction with FIG. 3 hereinabove, will be discussed in hereinbelow using the embodiment of a pressurized medium control system 12 illustrated in FIG. 4 as an example.

Figure 4:
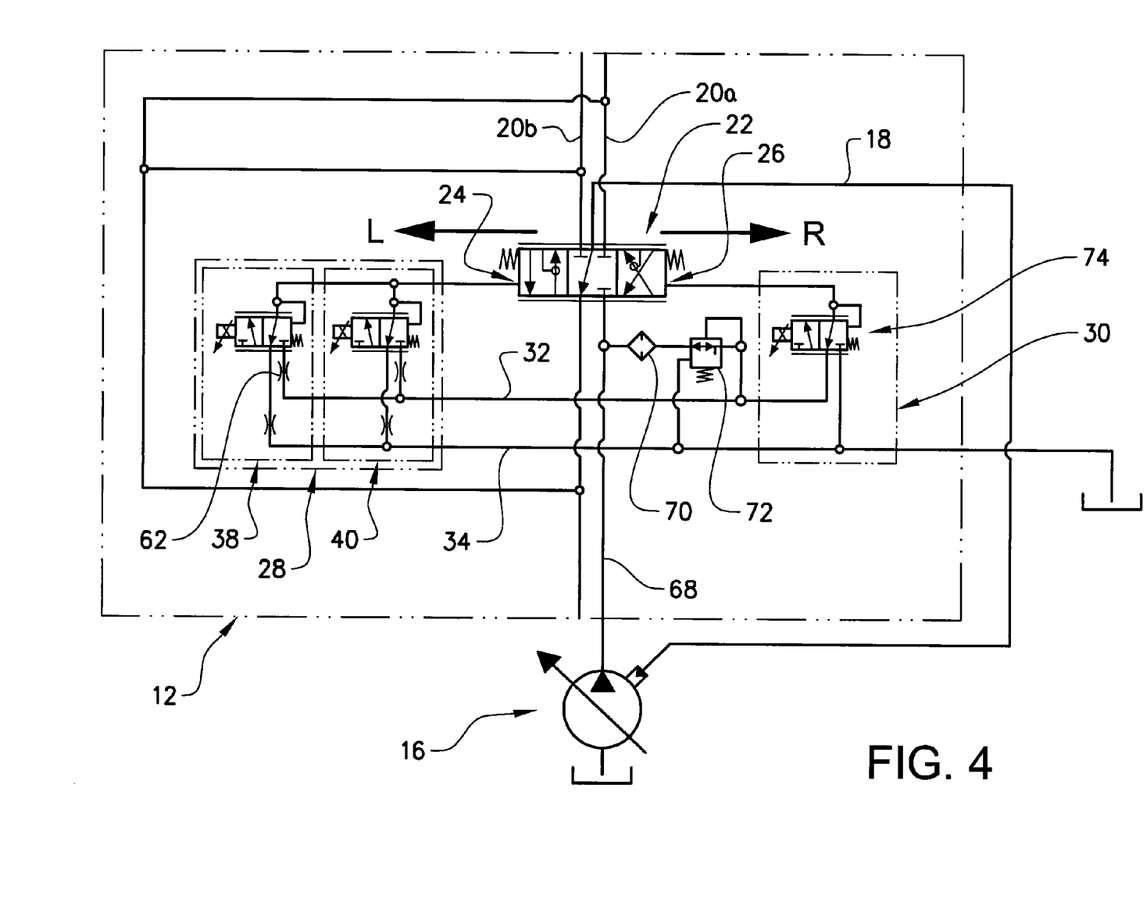
FIG. 4 schematically illustrates an embodiment of a pressurized medium control system.

The FIG. 4 pressurized medium control system 12 comprises a pressure inlet 68 that is adapted to provide a fluid communication between a pressure source 16 and a control valve 72. Moreover, the pressure inlet 68 is adapted to provide a fluid communication between the pressure source 16 and a pressure line 32. To this end, the pressurized medium control system 12 may comprise a filter 70 and a pressure reducer 72.

The pressure reducer 72 may be adapted to reduce the pressure of the medium that is supplied to the pressure line 32 from the pressure inlet 68. Purely by way of example, the pressure reducer 72 may be adapted to supply fluid to the pressure line 32 that is equal to or less than 70%, more preferred less than or equal to 60% of the pressure in the pressure inlet 68.

As a non-limiting example pressure source 16 may be adapted to provide a pressure of approximately 60 bars and the pressure reducer may be adapted to reduce the pressure to 35 bars.

The FIG. 4 embodiment of the pressurized medium control system 12 comprises an embodiment of the pilot pressure control system 28 of the present invention for supplying a pilot signal pressure to a first pilot inlet 24 of the control valve 22. Moreover, the FIG. 4 embodiment comprises a second pilot pressure control system 30 which in turn comprises an electrically controlled pressure reducing valve 74 which is adapted to be in fluid communication with the pressure line 32 and the drain line 34. As such, by virtue of the second pilot pressure control system 30, the pilot signal pressure at the second pilot inlet 26 may be varied within the range of the pressure Pdi at the drain line 34 to the pressure Ppi at the pressure line 32.

During normal operations, each one of the first and second pilot valve assemblies 38, 40 of the first pilot pressure control system 28 as well as the electrically controlled pressure reducing valve 74 of the second pilot pressure control system 30 are controlled such that desired pilot signal pressure is supplied to each one of the first and second pilot inlets 24, 26 of the control valve 22.

If the pilot signal pressure at the first pilot inlet 24 exceeds the pilot signal pressure at the second pilot inlet 26, the control valve 22 will be displaced in a direction that is indicated by arrow R in FIG. 4. Conversely, if the pilot signal pressure at the second pilot inlet 26 exceeds the pilot signal pressure at the first pilot inlet 24, the control valve 22 will be displaced in a direction that is indicated by arrow L in FIG. 4.

However, the second pilot valve assembly 40 may be impaired such that it inadvertently provides a fluid communication with a minimum pressure drop from the pilot outlet 36 to the drain line 34. As a non-limiting example, the second pilot valve assembly 40 may be impaired such that it provides a maximum opening for fluid flowing from the pilot outlet 36 to the drain line 34 via the second pilot valve assembly 40.

In such a scenario, there could be a risk that pressurized medium flows from the first pilot valve assembly 38 to the second pilot valve assembly 40 such that only a pressure that is close to the pressure Pdi at the drain line 34 is obtainable at the first pilot inlet 24. Thus, in the above discussed scenario, there is a risk that the maximum pressure at the first pilot inlet 24 cannot not to a sufficient extent exceed the lowest pressure obtainable at the second pilot inlet 26. This would in turn imply that there is a risk that the control valve 22 cannot be displaced in a direction that is indicated by arrow R in FIG. 4.

However, by virtue of the fact that the pilot pressure control system 28 is configured such that the pressure at the pilot outlet 36, and thus at the first pilot inlet 24, is equal to or above 20%, preferably equal to or above 30%, of the first pilot valve assembly maximum pressure Pmax, it is ensured that it will be possible to obtain a pressure at the first pilot inlet 24 that exceeds the lowest pressure at the second pilot inlet 26. This in turn implies that the control valve 22 can be displaced in direction R even in a situation when the second pilot valve assembly 40 inadvertently provides a fluid communication with a minimum pressure drop from the pilot outlet 36 to the drain line 34.

Another scenario is that the first pilot valve assembly 38 is impaired such that it inadvertently assumes its maximum pressure supply condition. In such a scenario, there could be a risk that pressurized medium is supplied from the first pilot valve assembly 38 to the first pilot inlet 24 at a pressure that is close to the pressure Ppi at the pressure line 32. Thus, in the above discussed scenario, there is a risk that the maximum pressure at the second pilot inlet 26 cannot to a sufficient extent exceed the pressure obtained at the first pilot inlet 24. This in turn implies that there is a risk that the control valve 22 cannot be displaced in a direction that is indicated by arrow L in FIG. 4.

However, by virtue of the fact that the pilot pressure control system 28 is configured such that the pressure at the pilot outlet 36, and thus at the first pilot inlet 24, is equal to or below 80%, preferably equal to or below 70%, more preferred equal to or below 60%, of the first pilot valve assembly maximum pressure Pmax, it is ensured that it will be possible to obtain a pressure at the second pilot inlet 26 that exceeds the highest pressure at the first pilot inlet 24. This in turn implies that the control valve 22 can be displaced in direction L even if the first pilot valve assembly 38 inadvertently assumes its maximum pressure supply condition.

Figure 5:
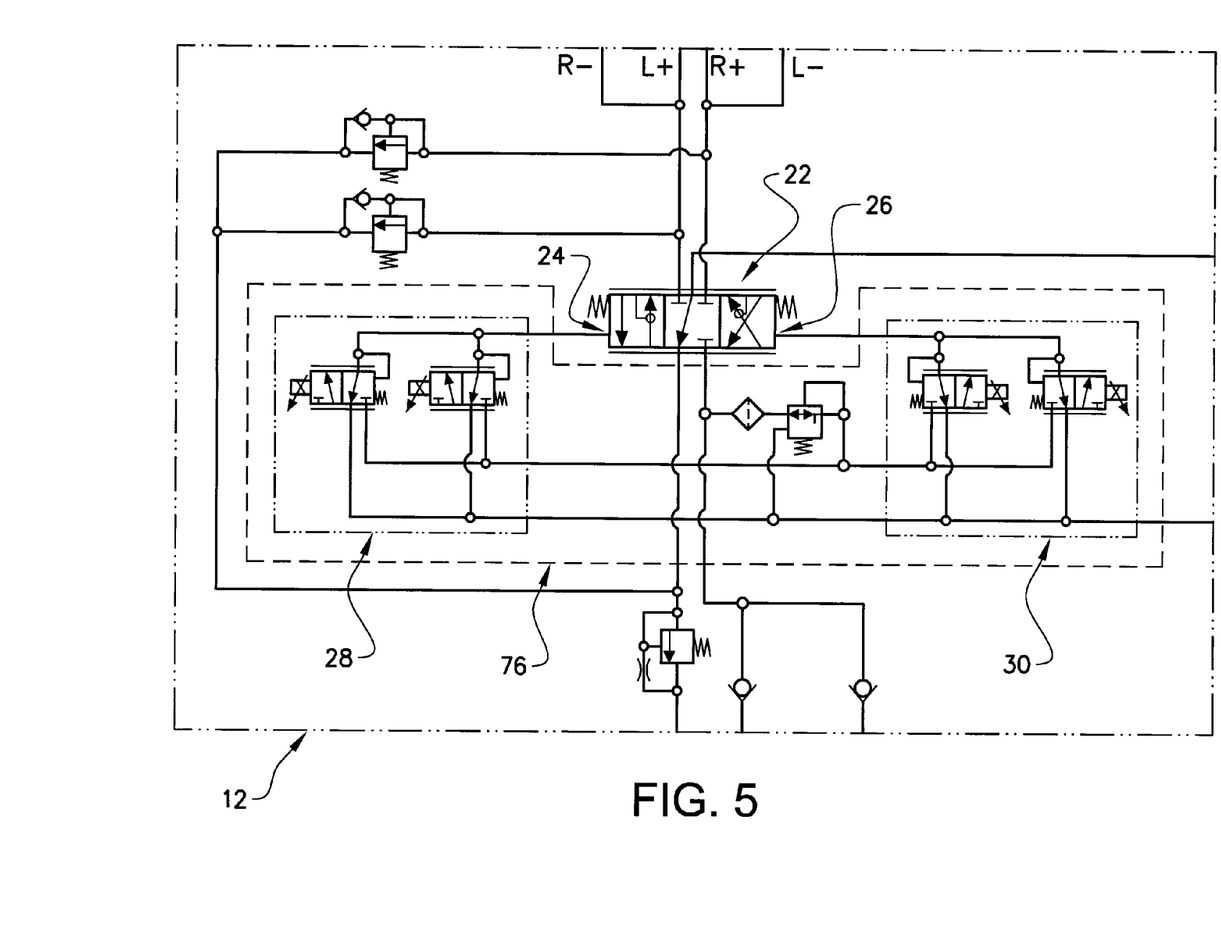
FIG. 5 schematically illustrates another embodiment of a pressurized medium control system.

FIG. 5 illustrates another embodiment of a pressurized medium control system 12. The FIG. 5 pressurized medium control system 12 comprises a pilot pressure control assembly 76 that in turn comprises a first pilot pressure control system 28, according to any one of the above discussed embodiments, and a second pilot pressure control system 30, according to any one of the above discussed embodiments.

The first pilot pressure control system 28 is adapted to control a pilot signal pressure at a first pilot inlet 24 of a control valve 22 and the second pilot pressure control system 30 is adapted to control a pilot signal pressure at a second pilot inlet 26 of the control valve 22. One advantage of controlling each one of the first and second pilot inlets 24, 26 by a pilot pressure control system according to an embodiment of the present invention is that the reliability of the pressurized medium control system 12 may be increased as compared to e.g. the FIG. 4 system.

In the FIG. 5 embodiment, each one of the first and second pressure control systems 28, 30 comprises a throttling arrangement that in turn comprises drain and pressure valve throttlings.

Figure 6:
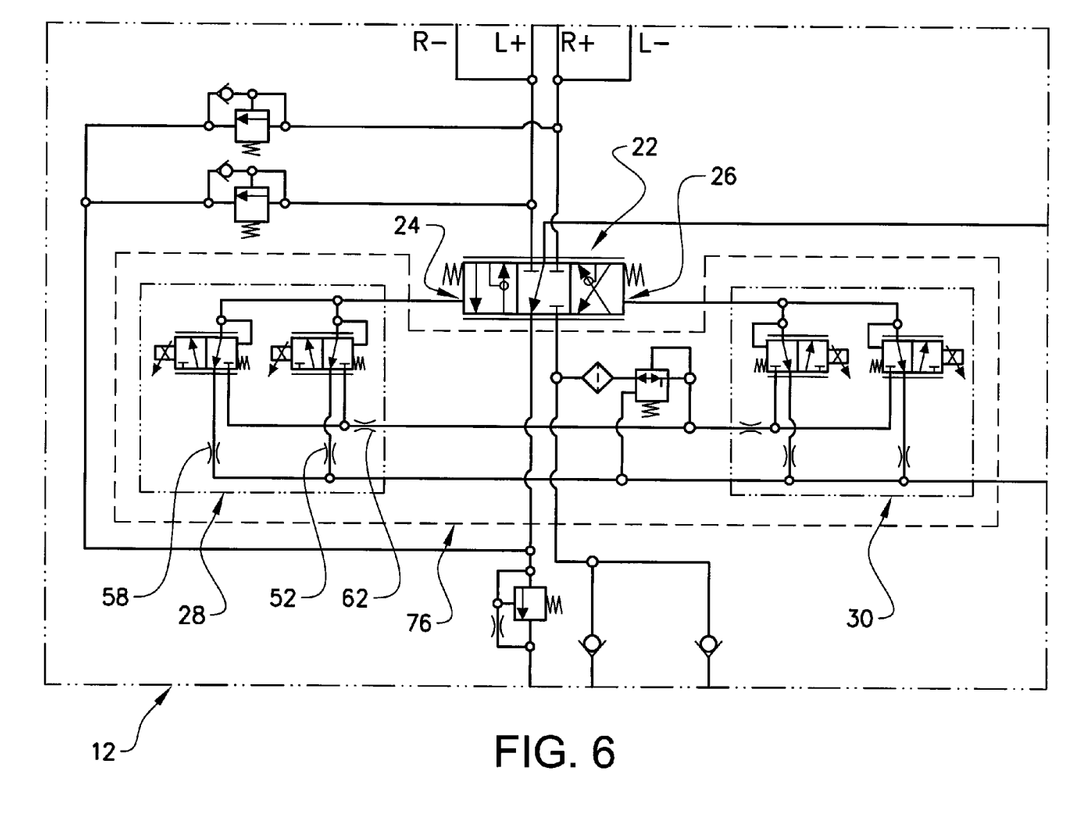
FIG. 6 schematically illustrates a further embodiment of a pressurized medium control system, and
FIG. 7 schematically illustrates an additional embodiment of a pressurized medium control system.

FIG. 6 illustrates an embodiment of a pressurized medium control system 12 that is similar to the FIG. 5 embodiment but wherein the throttling arrangement of each one of the first and second pressure control systems 28, 30 comprises a lower drain throttling 52, 58 associated with each one attic first and second pilot valve assemblies 38, 40 as well as a lower pressure throttling 62 that is common for both the first and second pilot valve assemblies 38, 40.

Figure 7:
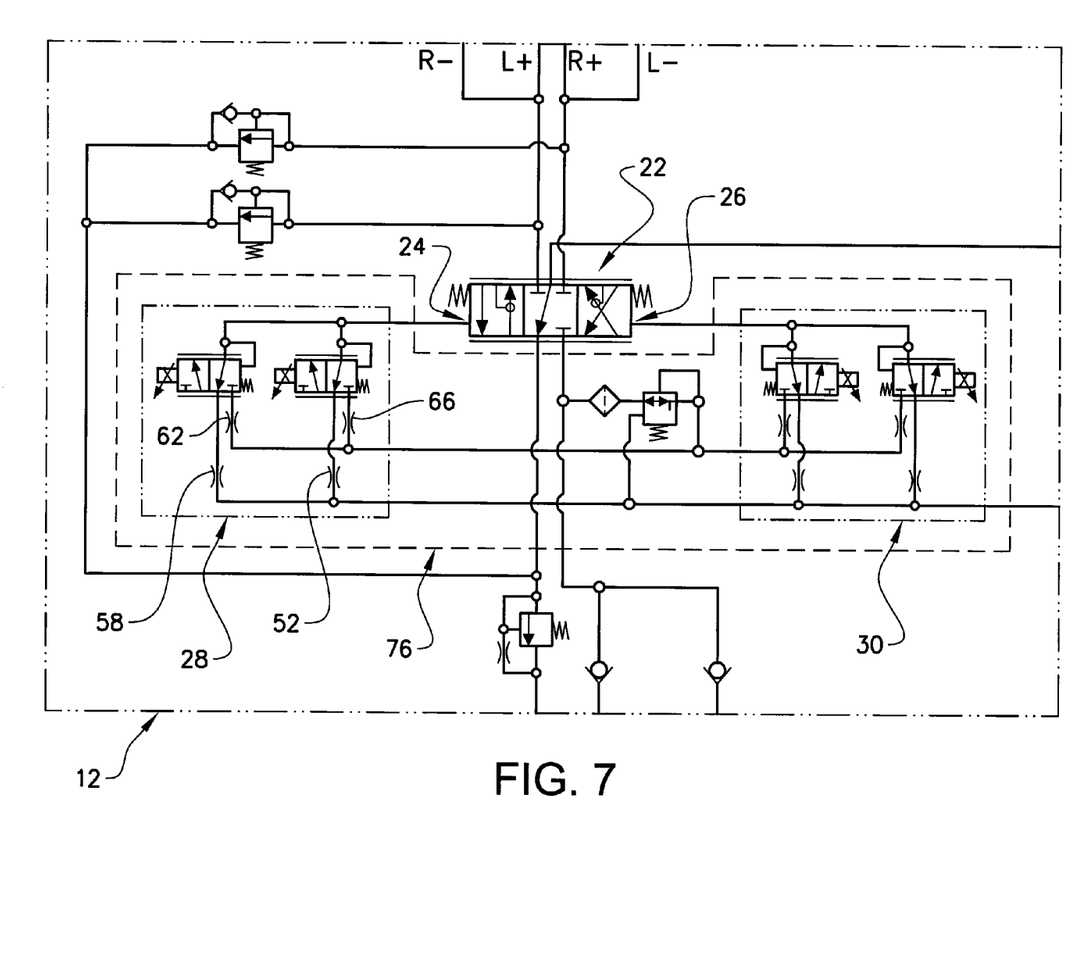

FIG. 7 illustrates an embodiment of a pressurized medium control system 12 that is similar to the FIG. 5 and FIG. 6 embodiments but wherein the throttling arrangement of each one of the first and second pressure control systems 28, 30 comprises a lower drain throttling 52, 58 as well as a lower pressure throttling 62, 66 associated with each one of the first and second pilot valve assemblies 38, 40.

Finally, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pilot pressure control system for controlling a pilot signal pressure at a pilot inlet of a control valve, the pilot pressure control system comprising a pilot outlet adapted to be connected to the pilot inlet, wherein the pilot pressure control system further comprises a first pilot valve assembly and a second pilot valve assembly, each one of the first and second pilot valve assemblies being individually controllable so as to selectively provide a first fluid flow direction from a pressure line to the pilot outlet and a second fluid flow direction from the pilot outlet to a drain line, at least the first pilot valve assembly being adapted to assume a maximum pressure supply condition so as to supply a first pilot valve assembly maximum pressure to the pilot outlet, at least the second pilot valve assembly being adapted to provide a pressure drop from the pilot outlet to the drain line via the second pilot valve assembly, the pilot pressure control system being configured such that, when the pilot pressure control system is connected to the pressure and drain lines and when the first pilot valve assembly is controlled so as to assume the maximum pressure supply condition and the second pilot valve assembly provides a fluid flow in the second fluid direction with a minimum pressure drop, the pressure at the pilot outlet is equal to or above 20% of the first pilot valve assembly maximum pressure.

2. The pilot pressure control system according to claim 1, wherein, when the first pilot valve assembly is controlled so as to assume the maximum pressure supply condition and the second pilot valve assembly provides a minimum pressure drop, the pressure at the pilot outlet is equal to or less than 80% of the first pilot valve assembly maximum pressure.

3. The pilot pressure control system according to claim 1, wherein the pilot pressure control system comprises a throttling arrangement adapted to throttle fluid flowing from the pilot outlet to the drain line via the second pilot valve assembly.

4. The pilot pressure control system according to claim 3, wherein the throttling arrangement is also adapted to throttle fluid flowing from the pressure line to the pilot outlet via the first pilot valve assembly.

5. The pilot pressure control system according to claim 1, wherein at least one of the pilot valve assemblies comprises a solenoid valve.

6. A pilot pressure control system according to claim 1, wherein the first pilot pressure control system is configured for controlling pilot pressure at a first pilot inlet of the control valve, and the second pilot pressure control system is configured for controlling pilot pressure at a second pilot inlet of the control valve.

7. A pressurized medium control system, the control system comprising the pilot pressure control system according to claim 1.

8. A pressurized medium steering assembly for an articulated vehicle, the pressurized medium steering assembly comprising the pilot pressure control system according to claim 1.

9. A vehicle comprising the pilot pressure control system according to claim 1.

10. A method for supplying a pilot pressure to a pilot inlet of a control valve using a pilot pressure control assembly, the pilot pressure control assembly comprising a first pilot valve assembly and a second pilot valve assembly, each one of the first and second pilot valve assemblies being individually controllable so as to selectively provide a first fluid flow direction from a pressure line to the pilot inlet and a second fluid flow direction from the pilot inlet to a drain line, the method comprising:
  issuing individual control signals to each one of the first and second pilot valve assemblies, and
  for at least one of the first and second pilot valve assemblies, throttling a fluid flow from the pilot inlet to the drain line while supplying fluid flow from the pressure line to the pilot inlet via the other one of the first and second pilot valve assemblies.

11. The method according to claim 10, wherein the method further comprising:
  for at least one of the first and second pilot valve assemblies, throttling a fluid flow from the pressure line to the pilot inlet.

* * * * *